United States Patent
Canal Vila

(10) Patent No.: US 9,874,198 B2
(45) Date of Patent: Jan. 23, 2018

(54) METHOD OF OPERATING A WIND TURBINE

(71) Applicant: ALSTOM RENOVABLES ESPAÑA, S.L., Barcelona (ES)

(72) Inventor: Marc Canal Vila, Barcelona (ES)

(73) Assignee: ALSTOM Renewable Technologies, Grenoble (FR)

(*) Notice: Subject to any disclaimer, the term of this patent is extended or adjusted under 35 U.S.C. 154(b) by 592 days.

(21) Appl. No.: 14/225,344

(22) Filed: Mar. 25, 2014

(65) Prior Publication Data

US 2014/0294584 A1 Oct. 2, 2014

(30) Foreign Application Priority Data

Mar. 27, 2013 (EP) .................................... 13382120

(51) Int. Cl.
*F03D 7/02* (2006.01)

(52) U.S. Cl.
CPC ........... *F03D 7/0224* (2013.01); *F03D 7/024* (2013.01); *F03D 7/0288* (2013.01); *F05B 2270/17* (2013.01); *F05B 2270/32* (2013.01); *F05B 2270/33* (2013.01); *Y02E 10/723* (2013.01)

(58) Field of Classification Search
USPC ............................................. 700/287; 416/1
See application file for complete search history.

(56) References Cited

U.S. PATENT DOCUMENTS

| | | | | |
|---|---|---|---|---|
| 2006/0132994 A1* | 6/2006 | Delmerico | ............. | F03D 7/028 361/20 |
| 2010/0014969 A1* | 1/2010 | Wilson | .................... | F03D 1/008 416/1 |
| 2011/0144815 A1* | 6/2011 | Neumann | ............. | F03D 7/0288 700/287 |
| 2011/0262272 A1* | 10/2011 | Nies | ........................ | F03D 80/70 416/1 |

(Continued)

FOREIGN PATENT DOCUMENTS

| WO | WO 2012/013195 | 2/2012 |
|---|---|---|
| WO | WO 2013/000810 | 1/2013 |

OTHER PUBLICATIONS

European Search Report for EP 13382120, dated Sep. 4, 2013, 7 pgs.

*Primary Examiner* — Jason Lin
(74) *Attorney, Agent, or Firm* — Dority & Manning, P.A.

(57) ABSTRACT

Method of operating a wind turbine having a tower, a rotor with a plurality of blades arranged on the tower, one or more pitch systems for pitching the blades, a system for determining an instantaneous representative wind speed, and a system for determining a distance between a blade and the tower. The method comprises determining the instantaneous representative wind speed, and determining the distance between the tower and one of the blades when said blade is in the shadow of the tower. The method further comprises determining a tower distance pitch adjustment depending on the determined distance between the tower and the blade in the shadow of the tower and on the determined instantaneous representative wind speed. The method still further comprises the one or more pitch systems applying the determined tower distance pitch adjustment to at least the next blade to be in the shadow of the tower.

13 Claims, 5 Drawing Sheets

(56) References Cited

U.S. PATENT DOCUMENTS

| | | | | |
|---|---|---|---|---|
| 2013/0045098 A1* | 2/2013 | Taylor | ............... | F03D 7/0224 |
| | | | | 416/1 |
| 2013/0144449 A1* | 6/2013 | Dalsgaard | ............ | F03D 7/048 |
| | | | | 700/287 |
| 2013/0189102 A1* | 7/2013 | Wedel-Heinen | ...... | F03D 7/0224 |
| | | | | 416/42 |
| 2014/0030090 A1* | 1/2014 | Kammer | ............. | F03D 17/00 |
| | | | | 416/1 |
| 2014/0125058 A1* | 5/2014 | Olesen | .................. | G01P 5/20 |
| | | | | 290/44 |

* cited by examiner

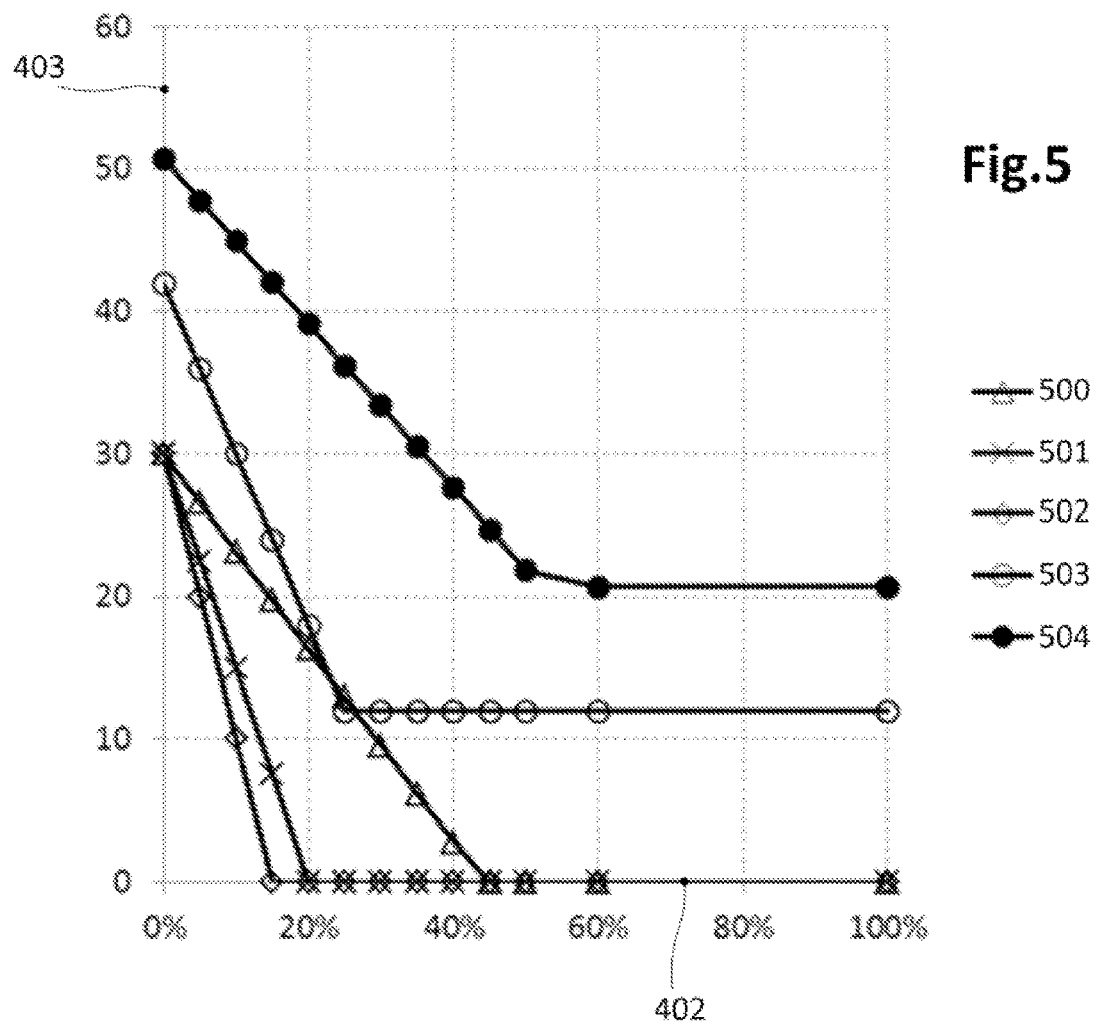

METHOD OF OPERATING A WIND TURBINE

This application claims the benefit of European Patent Application EP 13382120.7 filed 27 Mar. 2013, the disclosure of which is hereby incorporated by reference in its entirety for all purposes.

The present invention relates to a method of operating a wind turbine and to a wind turbine suitable for performing such a method.

BACKGROUND ART

Modern wind turbines are commonly used to supply electricity into the electrical grid. Wind turbines of this kind generally comprise a tower and a rotor arranged on the tower. The rotor, which typically comprises a hub and a plurality of blades, is set into rotation under the influence of the wind on the blades. Said rotation generates a torque that is normally transmitted through a rotor shaft, either directly or through the use of a gearbox, to a generator. This way, the generator produces electricity which can be supplied to the electrical grid.

Wind turbines may comprise pitch systems that are employed for adapting the position of the blades to varying wind conditions by rotating each blade along its longitudinal axis. Pitch systems may be used in control of a wind turbine to e.g. maintain a certain rotor speed and/or limit loads on the blades. Determination of loads on the blades, and on the turbine in general, is considered to be an important task to be performed during operation of the wind turbine to confirm that the generated loads are, in fact, acceptable.

One of the most common ways of determining loads on a wind turbine is based on using load sensors arranged on the blades. These load sensors may generally be based on methods of detecting loads by using e.g. a pressure sensor, a throttle sensor or a strain sensor, and/or methods of detecting loads by using intensity modulated light within one or more optical fibres which may deform as the blade deforms. Load sensors may suffer failures or malfunctions due to e.g. freezing, mechanical wear and/or saturation to full scale or zero of the sensors.

The way the load sensors are distributed on the blades may also have its effect on the quality of load measurements. Loads on the blades and, in general, on the wind turbine may depend on many parameters and rather variable magnitudes of said parameters. Examples of some parameters playing a role in generating loads on the blades are e.g. wind speed, wind direction, rotor speed, pitch angles, rotor position, etc. Taking this into account, an ideal distribution of sensors does not exist. Some distributions will produce good measurements under some operational conditions and some other distributions will produce good measurements under some other operational conditions.

FIGS. 1a, 1b and 1c will be used to discuss some of these problems of prior art systems based on load sensors on the blades and aimed at determining loads on a wind turbine. For the sake of simplicity, only one force, namely the weight of the blade, will be considered in the following description.

FIG. 1a shows a frontal view of a common wind turbine comprising three blades 100, 101, 102, and a hub 110 carrying the blades 100, 101, 102. One of the blades 100 has several load sensors 105-107. FIG. 1b shows a lateral view of a region 108 of the wind turbine from a lateral point of view 109, in which the first blade 100 may have a determined pitch angle 112. And FIG. 1c shows a lateral view of the region 108 of the wind turbine from the same lateral point of vision 109, in which the first blade 100 has another pitch angle.

FIG. 1b and FIG. 1c show a first load sensor 106 and a second load sensor 107 that are positioned in a flap-wise axis of the blade 100. FIG. 1b and FIG. 1c also show a third load sensor 105 and a fourth load sensor 111 which are positioned in an edge-wise axis of the blade 100. In FIG. 1b, the blade 100 has a pitch angle 112 of ninety degrees, whereas in FIG. 1c, the blade 100 has a pitch angle of zero degrees.

At the pitch angle 112 of ninety degrees (FIG. 1b), loads due to the weight of the blade 100 are sensed by the flap-wise sensors 106, 107 with high accuracy, since the sensitivity of said sensors 106, 107 at this position is good for measuring these loads. However, the edge-wise sensors 105, 111 will not provide equally good measurements of loads caused by the weight of the blade 100, since the sensitivity of said sensors 105, 111 at this position is inappropriate to measure these loads.

Similarly, at the pitch angle of zero degrees (FIG. 1c), loads due to the weight of the blade 100 are sensed by the edge-wise sensors 105, 111 with high accuracy, since the sensitivity of said sensors 105, 111 at this position is good. However, the flap-wise sensors 106, 107 will not provide equally good measurements of loads due to the weight of the blade 100.

At some intermediate positions (pitch angles) with respect to the ones shown in FIGS. 1b and 1c, the edge-wise sensors 105, 111 can be more appropriate than the flap-wise sensors 106, 107 to measure loads caused by the weight of the blade 100, and vice versa. At some other intermediate positions (e.g. at a pitch angle of 45 degrees), neither the edge-wise sensors 105, 111 nor the flap-wise sensors 106, 107 may provide useful measurements of loads due to the weight of the blade 100.

These considerations about the weight of the blade can be extended, taking into account corresponding particularities, to other loads on the blades, such as e.g. forces derived from the wind, the rotation of the rotor, and so on. Absolute forces resulting from rather complex combinations of such forces may make a distribution of load sensors suitable to measure the resulting loads in only some operational conditions (faced during operation of the wind turbine), whereas in other conditions the load sensors do not function as well.

It may be conceived to provide a high number of sensors of different types that ideally can measure loads well in any circumstance. However, this option may be expensive and complex, since it is based on having many sensors and processing many signals provided by the sensors.

There still exists a need for a new method of operating a wind turbine which at least partially reduces the abovementioned problems. It is an object of the present invention to fulfil such a need.

SUMMARY OF THE INVENTION

In a first aspect, the invention provides a method of operating a wind turbine having a tower, a rotor with a plurality of blades arranged on the tower, one or more pitch systems for pitching the blades, a system for determining an instantaneous representative wind speed, and a system for determining a distance between a blade and the tower. The method comprises determining the instantaneous representative wind speed, and determining the distance between the tower and one of the blades when said blade is in the shadow of the tower. The method further comprises determining a tower distance pitch adjustment depending on the determined distance between the tower and the blade in the shadow of the tower and on the determined instantaneous representative wind speed. The method still further comprises the one or more pitch systems applying the determined tower distance pitch adjustment to at least the next blade to be in the shadow of the tower.

In the case of upwind configurations, the expression "a blade in the shadow of the tower" refers to the situation in which the blade is in front of the tower or very close to be in front of the tower. For example, in a wind turbine having three equispaced blades, these blades may form together a substantially Y-shaped configuration of blades when one of the blades is in the shadow of the tower, while the other two blades are above the tower. The expression "in the shadow of the tower" also covers downwind configurations, even though, in this particular case, it may be understood that the tower is in front of the blade.

The expression "tower distance pitch adjustment" refers to a pitch adjustment based on the distance between the tower and a blade in the shadow of the tower, said adjustment being aimed at correcting abnormal situations probably caused by loads on the wind turbine. Examples of "tower distance pitch adjustments" may e.g. be a minimum pitch angle, a pitch angle variation (either increase or decrease), etc.

As commented with respect to the background art, load sensors arranged on e.g. a blade may be suitable or unsuitable for detecting some loads depending on the current operational conditions and the distribution of the sensors on the blade. The proposed method is aimed at providing a complementary way of detecting abnormal situations (possibly due to loads on the wind turbine), which may not always be properly detected by load sensors arranged on the blades and/or other locations of the wind turbine (such as e.g. the nacelle), and/or detecting these abnormal situations sooner.

This new method is based on determining pitch adjustments based on the wind speed and the distance between the tower of the wind turbine and one of the blades, when this blade is in the shadow of the tower. An advantage of this method may be that abnormal situations, possibly caused by excessive loads on the wind turbine, may be detected and corrected (by suitably pitching all or some of the blades) without taking into account measurements from load sensors on the blades and/or other locations of the wind turbine.

A detected distance between the tower and a blade may be considered normal (or acceptable) under normal operation of the wind turbine and a given wind speed. In this case, no corrective pitch adjustment may therefore be required. Nevertheless, a detected distance may be considered anomalous under normal operation of the wind turbine and a given wind speed. In this later case, a pitch adjustment may be determined and applied to correct said anomalous situation. This pitch adjustment may be a pitch actuation additional to those performed according to a conventional control strategy. For instance, the proposed method may define, as pitch adjustment, a minimum pitch angle which is set on the control instead of the pitch angle provided by the conventional control, the latter referring to the blade pitch control when the distance between the blade and the tower is not considered. The conventional control strategy may be based on individual pitch or collective pitch.

Another example of tower distance pitch adjustment may be an increase or decrease of the pitch angle. For example, a pitch angle can be increased above its normal value (established by a conventional control strategy) as the wind speed increases. At a wind speed of e.g. 25 m/s, the pitch angle may start to increase (with respect to its normal value) when the distance between the tower and the blade in the shadow of the tower is e.g. approximately 60% of its static value. At a wind speed of 15 m/s, the pitch angle may start to increase (with respect to its normal value) when the distance between the tower and the blade in the shadow of the tower is e.g. approximately 30% of its static value. Static value of the distance between the tower and the blade in the shadow of the tower refers to the distance between the tower and the blade in the rest position, that is when the wind is very low and the wind turbine is stopped (i.e. under static conditions).

In some embodiments, determining the tower distance pitch adjustment may comprise determining a distance threshold based on the instantaneous representative wind speed. When the distance between the tower and the blade in the shadow of the tower is above the distance threshold, the tower distance pitch adjustment may be a predefined tower distance pitch adjustment. When the distance between the tower and the blade in the shadow of the tower is below the distance threshold, the tower distance pitch adjustment may be determined depending on how much the distance between the tower and the blade in the shadow of the tower is below the distance threshold.

The distance threshold may increase as the instantaneous representative wind speed increases, when the instantaneous representative wind speed is above a nominal wind speed.

The tower distance pitch adjustment may be a minimum pitch angle, such that when the distance between the tower and the blade in the shadow of the tower is above the distance threshold, said minimum pitch angle may be a predefined pitch angle according to a conventional control strategy. When the distance between the tower and the blade in the shadow of the tower is below the distance threshold, said minimum pitch angle may increase as the distance between the tower and the blade in the shadow of the tower decreases, so that a new pitch value is set on the control and sent to the pitch actuator(s).

Instead of defining a minimum pitch angle as tower distance pitch adjustment, the tower distance pitch adjustment may also be an increase of the pitch angle of at least the next blade to be in the shadow of the tower. When the distance between the tower and the blade in the shadow of the tower is above the distance threshold, said increase of the pitch angle may be zero. When the distance between the tower and the blade in the shadow of the tower is below the distance threshold, said increase of the pitch angle may increase as the distance between the tower and the blade in the shadow of the tower decreases.

For example, a three dimensional function of pitch adjustment, wind speed, and distance to the tower may define a two dimensional function for each given wind speed. Each two dimensional function may define a variable pitch adjustment depending on the determined tower distance, such that a tower distance threshold may be defined for this two dimensional function. This tower distance threshold may define whether a minimum pitch angle or a pitch angle variation may be increased or not depending on whether the tower distance is above or below this tower distance threshold. Details about how tower distance pitch adjustment(s) may be determined will be provided in other parts of the description.

The one or more pitch systems may comprise a collective pitch system, such that an increase of the pitch angle may be applied to all the blades of the wind turbine. Alternatively, the one or more pitch systems may comprise an individual pitch system for each blade, such that an increase of the pitch angle may be only applied to the next blade of the wind turbine to be in the shadow of the tower. As a further alternative, a particular pitch angle increase may be determined for each blade from corresponding particular functions depending on e.g. the position (in the rotor plane) of each blade. For example, different pitch angles may be suitable depending on the instantaneous position of a blade, such as e.g. in or close to the shadow of the tower or in a position above the tower.

An aspect of combining embodiments of the proposed method with a collective pitch system may be that a simpler management of the pitch system may be implemented. An aspect of applying embodiments of the method with individual pitch systems may be that a greater flexibility in the method is provided, since each blade can be managed individually. This flexibility may cause an improved reliability of the method, since special pitch actions or adjustments may be performed depending on individual conditions of each blade.

The instantaneous representative wind speed may be determined based on a wind speed measurement of a nacelle mounted anemometer. This wind speed measurement of the nacelle mounted anemometer may be an average wind speed measured over a short period of time. This short period of time may be between 1-5 seconds. More particularly, this short period of time may be between 2-4 seconds. Still more particularly, this short period of time may be approximately 3 seconds.

A nacelle mounted anemometer will generally, due its location on top of the nacelle and behind the rotor, not measure the wind speed very accurately and its measurements may show a wind speed that largely varies with a high frequency. An attenuation of this inaccuracy may be achieved by obtaining an average wind speed in the way(s) mentioned before, and using said average as the instantaneous representative wind speed in subsequent calculations.

According to embodiments of the invention, the system for determining the distance between a blade and the tower may comprise an emitter arranged on each blade and a receiver arranged on the tower. Each of the emitters and the receiver may be arranged in such a way that, at least when any of the blades is in the shadow of the tower, a distance between the emitter of said blade (in the shadow of the tower) and the receiver can be inferred from a signal transmission between said emitter (in the shadow of the tower) and the receiver.

Alternatively to the embodiments based on emitters on the blades and a receiver on the tower, the system for determining the distance between a blade and the tower may comprise a receiver arranged on each blade and an emitter arranged on the tower. Each of the receivers and the emitter may be arranged in such a way that, at least when any of the blades is in the shadow of the tower, a distance between the receiver of said blade (in the shadow of the tower) and the emitter can be inferred from a signal transmission between the emitter and said receiver (in the shadow of the tower).

An aspect of using emitters and receivers of wireless signals may be that said emitters and receivers may be arranged on the tower or corresponding blade, in such a way that sensor deformation induced by push of the wind may be avoided. On the contrary, load sensors may require receiving push of the wind causing sensor deformation in order to measure loads caused by the wind. Therefore, the life of these emitters and receivers may be extended with respect to conventional load sensors.

In another aspect, the invention provides a wind turbine configured to perform the method of operating a wind turbine as previously described.

BRIEF DESCRIPTION OF THE DRAWINGS

Particular embodiments of the present invention will be described in the following by way of non-limiting examples, with reference to the appended drawings, in which:

FIG. 5 schematically illustrates several two dimensional curves obtained from the three dimensional curve of FIG. 4.

DETAILED DESCRIPTION OF EMBODIMENTS OF THE INVENTION

In the following description, numerous specific details are set forth in order to provide a thorough understanding of the present invention. It will be understood by one skilled in the art however, that the present invention may be practiced without some or all of these specific details. In other instances, well known elements have not been described in detail in order not to unnecessarily obscure the description of the present invention.

Figure 1:
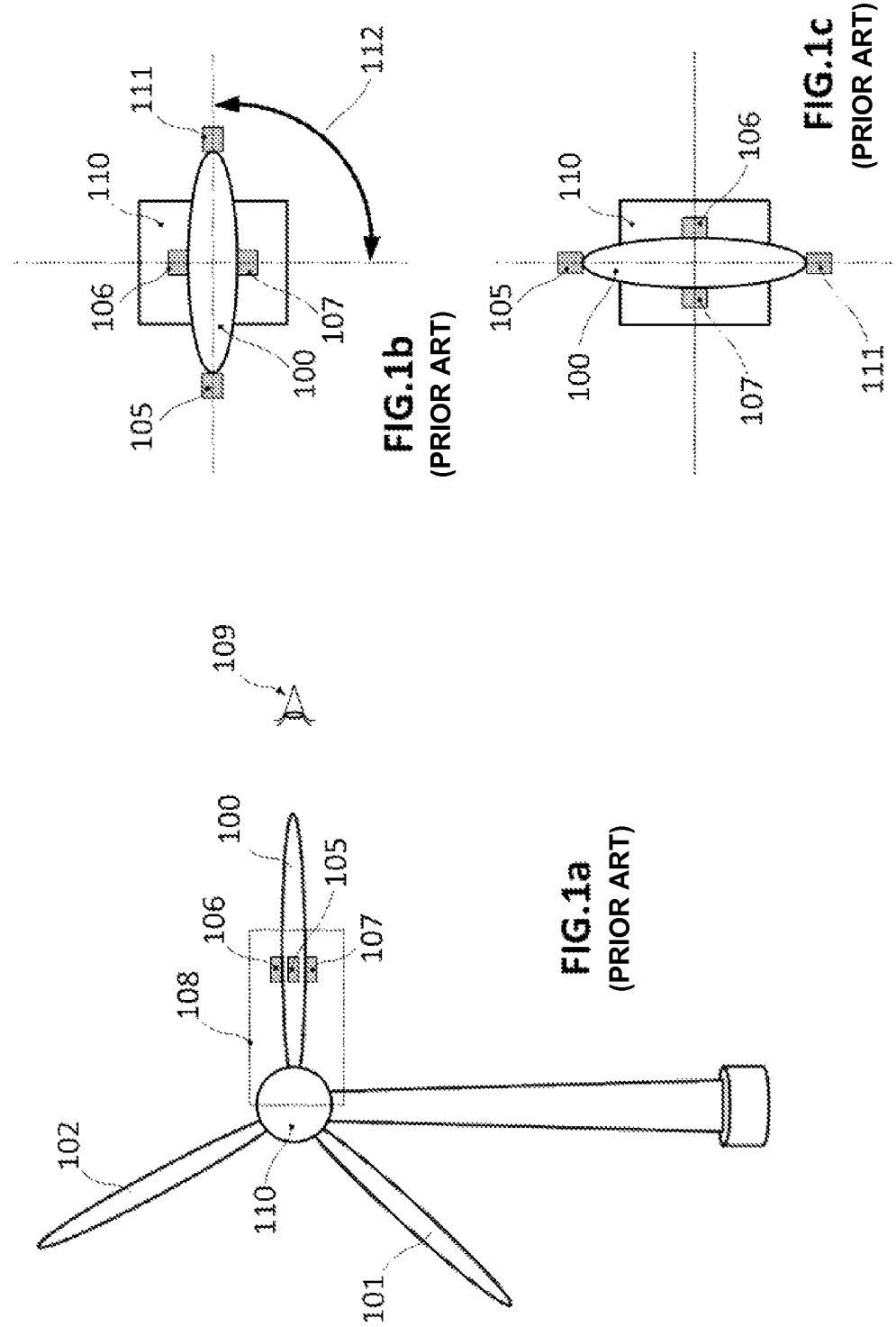
FIG. 1a schematically illustrates a prior art wind turbine with load sensors on a blade.
FIG. 1b schematically illustrates a view of the blade with load sensors of the wind turbine of FIG. 1a at a first pitch angle.
FIG. 1c schematically illustrates a view of the blade with load sensors of the wind turbine of FIG. 1a at a second pitch angle.
Figure 2:
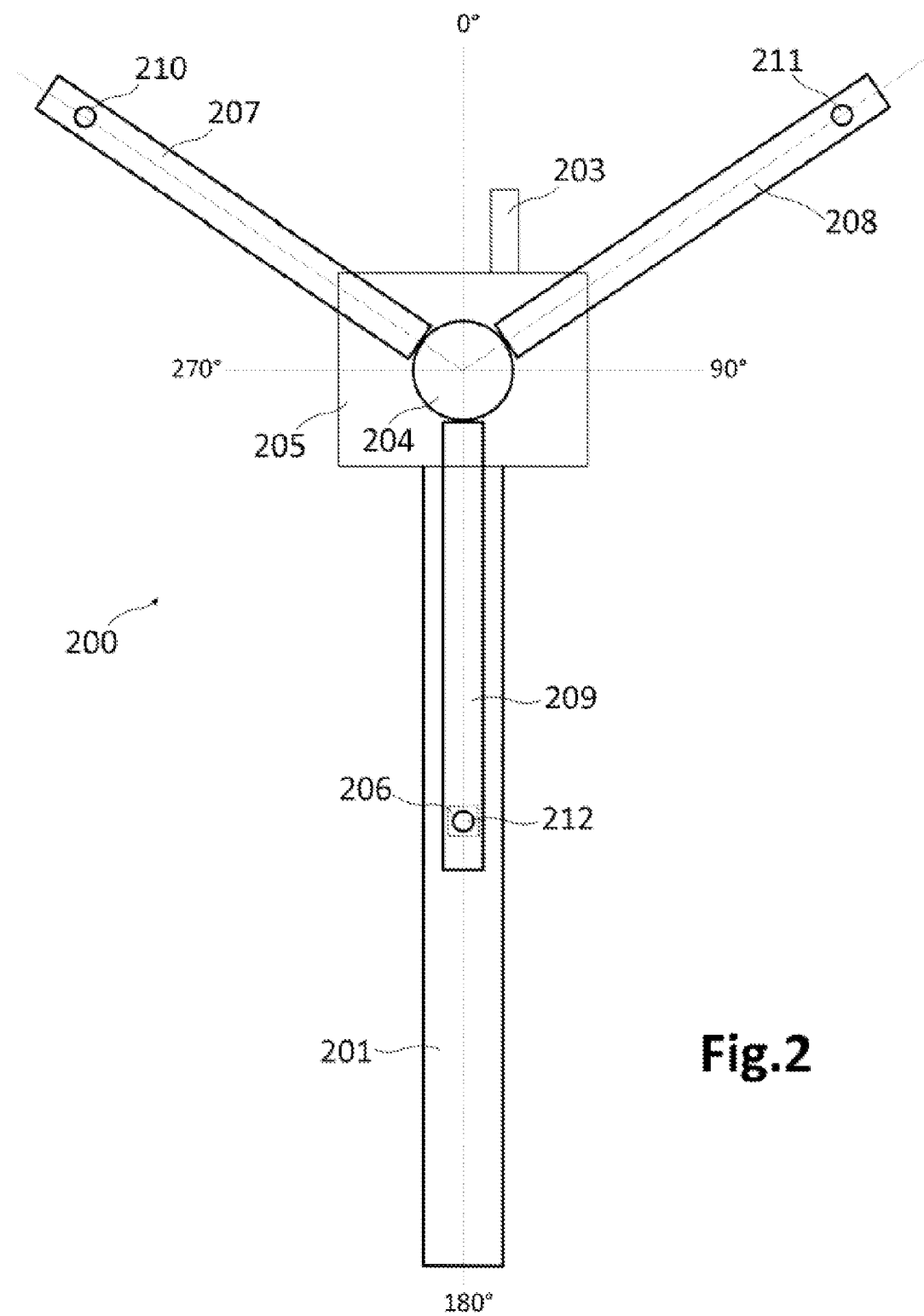
FIG. 2 is a schematic frontal view of a wind turbine according to an embodiment of the invention.

FIG. 2 is a schematic frontal view of a wind turbine according to an embodiment of the invention. This wind turbine 200 comprises a tower 201, a rotor with a plurality of blades 207-209 arranged on the tower 201, one or more pitch systems (not shown) for pitching the blades, and a system 206, 210-212 for determining a distance between a blade 209 and the tower 201. This wind turbine 200 is shown further comprising a device 203 for obtaining wind speed measurements, which may be used by a system for determining an instantaneous representative wind speed. One of the blades 209 is shown in a position in the shadow (i.e. substantially in front) of the tower 201.

The wind turbine 200 is shown further comprising a nacelle 205 on which the device 203 for obtaining wind speed measurements may be arranged. The wind turbine 200 is shown also comprising a hub 204 carrying the blades 207-209.

The system 206, 210-212 for determining a distance between the tower 201 and the blade 209 in the shadow of the tower may comprise a first type of component 210-212 arranged on each blade 207-209, and a second type of component 206 arranged on the tower 201. Each of the first type of components 210-212 and the second type of component 206 may be configured and arranged in such a way that, when any of the blades 209 is in the shadow of the tower 201, a distance between this blade 209 (in the shadow of the tower 201) and the tower 201 can be inferred. This inference of this distance may be performed from a signal transmission between the first type of component 212 (in the shadow of the tower 201) and the second type of component 206.

In some embodiments, the first type of component 210-212 may be an emitter of wireless signals, and the second type of component 206 may be a corresponding receiver. In alternative embodiments, the second type of component 206 may be an emitter of wireless signals, and the first type of component 210-212 may be a corresponding receiver. In further alternative embodiments, the first type of component 210-212 and the second type of component 206 may correspond to the same type of component combining both emitting and receiving capabilities. More details about possible implementations of the system for determining a distance between the tower 201 and the blade 209 (in the shadow of the tower) will be provided in later descriptions with reference to FIG. 3.

In embodiments of the invention, the system for determining an instantaneous representative wind speed may comprise an anemometer 203 mounted on the nacelle (as suggested before). The anemometer 203 may provide a wind speed measurement, such that the instantaneous representative wind speed may be determined from this wind speed measurement.

The wind speed measurement (provided by the anemometer 203) upon which the determination of the instantaneous representative wind speed may be based, may be an average wind speed as measured by the anemometer 203 over a period of e.g. 1-5 seconds, e.g. 3 seconds. Alternatively, any other system for determining a representative wind speed can be used, such as e.g. a LIDAR, measurement pole, etc.

This wind turbine 200 may comprise a control unit programmed to perform embodiments of the method provided by the invention. These embodiments of the method may comprise determining the instantaneous representative wind speed (by using the system based on the device 203), and determining the distance between the tower 201 and one of the blades 209 when said blade is in the shadow of the tower 201 (by using the system 206, 210-212 aimed at that). These embodiments of the method may further comprise determining a tower distance pitch adjustment depending on the determined distance between the tower 201 and the blade 209 in the shadow of the tower 201 and on the determined instantaneous representative wind speed. Then, the one or more pitch systems may apply the determined tower distance pitch adjustment to at least the next blade 211 to be in the shadow of the tower 201.

In some embodiments, the wind turbine 200 may comprise a collective pitch system, such that the determined tower distance pitch adjustment may be applied to all the blades 207-209 of the wind turbine 200. Alternatively, the wind turbine 200 may comprise an individual pitch system for each blade 207-209, such that the determined tower distance pitch adjustment may be applied individually to any number of blades 207-209 of the wind turbine 200. For example, the determined tower distance pitch adjustment may only be applied to the next blade 208 to be in the shadow of the tower 201, by its related pitch system.

Figure 3:
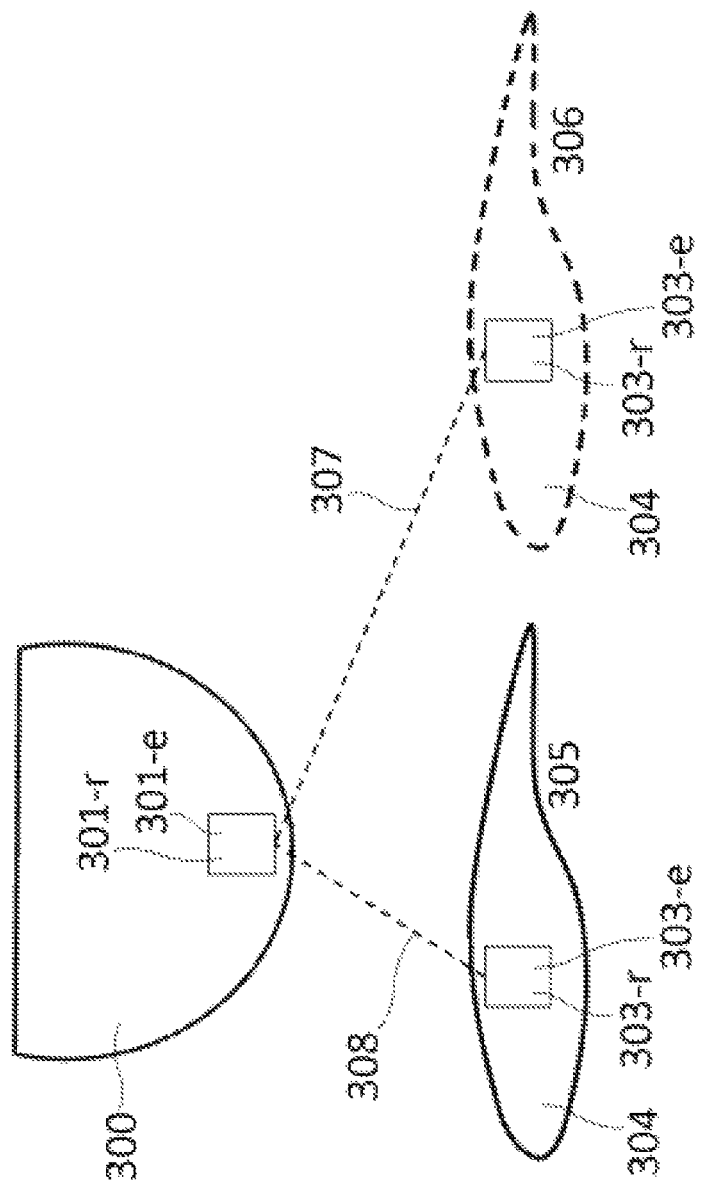
FIG. 3 schematically illustrates a sector of a tower and a blade of a wind turbine comprising a system for measuring the distance between the tower and the blade, said system being suitable for embodiments of the invention.

FIG. 3 schematically illustrates a view of a sector of a tower 300 and a blade 304 of a wind turbine comprising a system for measuring the distance between the tower 300 and the blade 304, said system being suitable for embodiments of the invention. The blade 304 is shown in a first position 305 and in a second position 306 with respect the tower 300.

In some embodiments, the tower 300 may comprise an emitter 301-$e$ and the blade 304 may comprise a receiver 303-$r$, such that a suitable signal may be transmitted by the emitter 301-$e$ and received by the receiver 303-$r$. However, in alternative embodiments, the blade 304 may comprise an emitter 303-$e$ and the tower 300 may comprise a receiver 301-$r$, such that a suitable signal may be transmitted by the emitter 303-$e$ and received by the receiver 301-$r$. In further alternative embodiments, the blade 304 may comprise an emitter and receiver 303-$e$, 303-$r$ and the tower 300 may also comprise an emitter and receiver 301-$e$, 301-$r$, such that a suitable signal may be transmitted by the blade's emitter/receiver 303-$e$, 303-$r$ and received by the tower's emitter/receiver 301-$e$, 301-$r$, and/or another suitable signal may be transmitted by the tower's emitter/receiver 301-$e$, 301-$r$ and received by the blade's emitter/receiver 303-$e$, 303-$r$, or both.

In order to improve the quality of tower distance measurements, the blade's emitter and/or receiver and the tower's emitter and/or receiver could preferably be horizontally aligned when the blade is in the shadow of the tower. That is, the tower's emitter and/or receiver may be arranged at a given height with respect to the ground, and the blade's emitter and/or receiver may be arranged such that, when the blade is in the shadow of the tower, the blade's emitter and/or receiver achieves a position at the substantially same height than the tower's emitter and/or receiver. Furthermore, in order to increase the accuracy of distance measurements, the blade's emitter and/or receiver may be arranged in a position close to the tip, since blade deformation is typically greater in the tip than in other regions of the blade. The sensitivity of the measurements may thus be increased.

In any case, the calculation of the distance 307 or 308 between the blade 304 and the tower 300 may be based on calculating a difference between a first time and a second time. This first time may be the time at which the signal is generated by the corresponding emitter 301-$e$ or 303-$e$. This second time may be the time at which the signal is received by the corresponding receiver 303-$r$ or 301-$r$. This calculated difference of times may thus correspond to the time it took the signal to travel from the emitter 301-$e$ or 303-$e$ to the receiver 303-$r$ or 301-$r$.

Then, the distance between the tower 300 and the blade 304 may be calculated from this travel time of the signal and corresponding technical features of the signal. For example, if the signal has a travel speed of TS (in e.g. m/s) and the signal has taken TT seconds to reach the receiver 303-$r$ or 301-$r$, the distance between the tower 300 and the blade can be obtained from multiplying TS by TT (distance=TS*TT).

As a blade rotates 360°, the distance between emitter and receiver may be determined substantially continuously. The measurement that determines the distance of the blade to the tower which will be used as a parameter in the various methods of the invention may then be the minimum distance measured in each 360° rotation.

Figure 4:
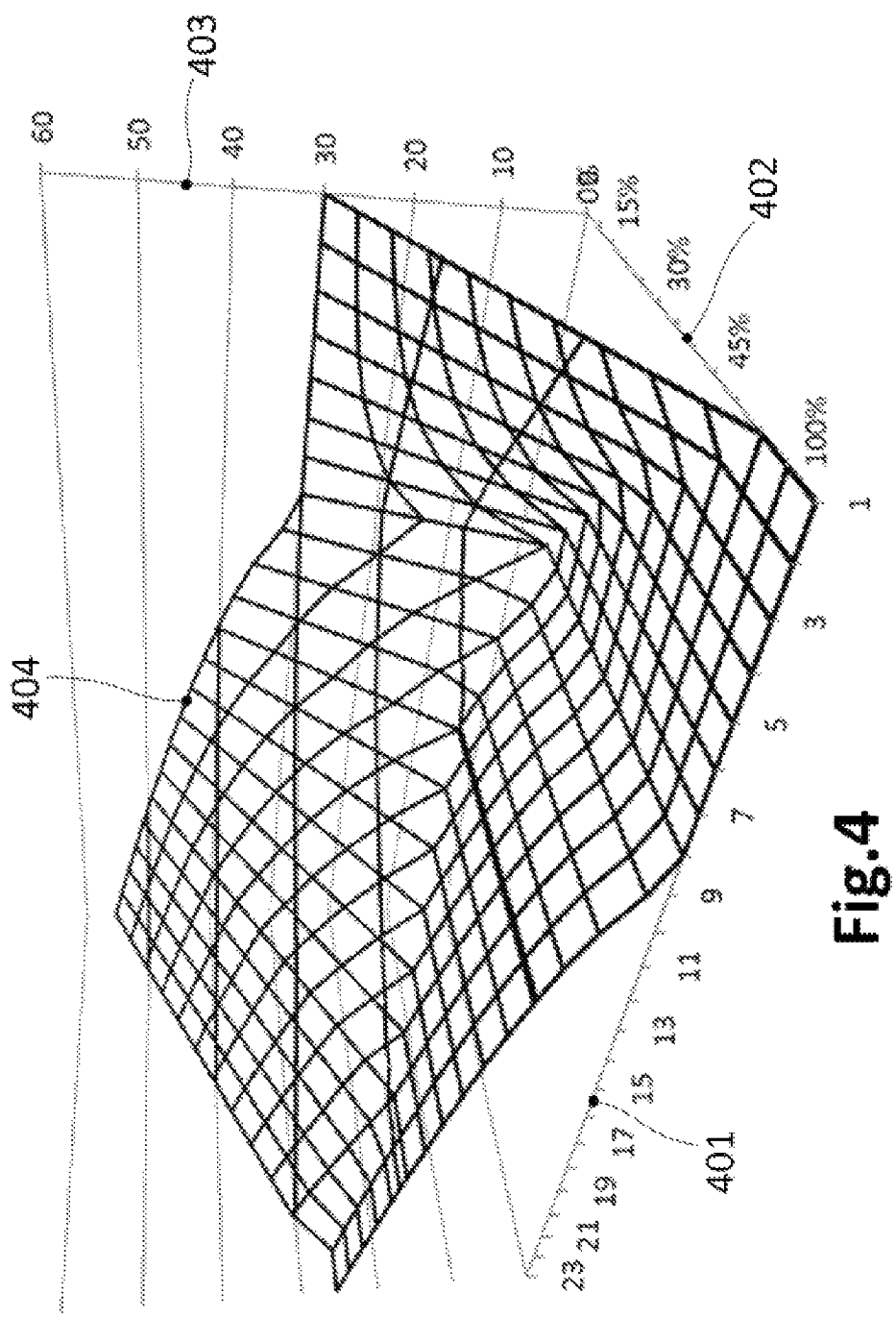
FIG. 4 schematically illustrates a three dimensional curve defining a variable pitch angle as a function of the wind speed and the distance between a blade and a tower of a wind turbine, said curve being suitable for use in embodiments of the invention.

FIG. 4 schematically illustrates a three dimensional curve defining a variable blade pitch angle as a function of the wind speed and the distance between a blade and a tower of a wind turbine, said curve being suitable for use in embodiments of the invention. This graphic comprises three different axes 401-403. The axis 401 corresponds to a wind speed scale in m/s. The axis 402 corresponds to a scale of percentages of tower-blade distance with respect to the distance in static (i.e. non-operational) conditions. The axis 403 corresponds to a scale of pitch angles to be set on the control, in degrees.

It can be derived from this three dimensional curve 404 that different wind speeds 401 may have defined different relations between the pitch angle 403 to be set and the distance ratio 402 between the tower and the blade in the shadow of the tower.

FIG. 4 illustrates that a tower-blade distance ratio 402 of 0% has an associated curve relating pitch 403 and wind speed 401 very similar to the curve corresponding to the tower-blade distance ratio 402 of 100%. However, the curve corresponding to the tower-blade distance ratio 402 of 0% appears raised 30 degrees with respect to the curve corresponding to the tower-blade distance ratio 402 of 100%. It can be appreciated that this "raise" is not equal and constant for all the wind speeds 401, but a different behaviour is followed depending on the operational range (i.e. wind speed).

A variable speed wind turbine may typically be controlled by varying the generator torque and the pitch angle of the blades. As a result, aerodynamic torque, rotor speed and electrical power will vary. Taking this into account, four operational ranges may be considered in a conventional control strategy.

In a first operational range, from the cut-in wind speed to a first wind speed (e.g. approximately 5 or 6 m/s), the rotor may be controlled to rotate at a substantially constant speed that is just high enough to be able to accurately control it. The cut-in wind speed may be e.g. approximately 3 m/s.

In a second operational range, from the first wind speed (e.g. approximately 5 or 6 m/s) to a second wind speed (e.g. approximately 8.5 m/s), the objective is generally to maximize power output while maintaining the pitch angle of the blades constant so as to capture maximum energy. In order to achieve this objective, the generator torque and rotor speed may be suitably varied.

In a third operational range, which starts at reaching nominal rotor rotational speed and extends until reaching nominal power, the rotor speed may be kept constant, and the generator torque may be varied to such effect. In terms of wind speeds, this third operational range extends substantially from the second wind speed to the nominal wind speed e.g. from approximately 8.5 m/s to approximately 11 m/s.

In a fourth operational range, which may extend from the nominal wind speed to the cut-out wind speed (for example from approximately 11 m/s to 25 m/s), the blades may be rotated ("pitched") to maintain the aerodynamic torque delivered by the rotor substantially constant. In practice, the pitch may be actuated such as to maintain the rotor speed substantially constant. At the cut-out wind speed, the wind turbine's operation is interrupted.

In the first, second and third operational ranges, i.e. at wind speeds below the nominal wind speed (the sub-nominal zone of operation), the blades are normally kept in a constant pitch position, namely the "below rated pitch position". Said default pitch position may generally be close to a 0° pitch angle. The exact pitch angle in "below rated" conditions however depends on the complete design of the wind turbine. And in the supra-nominal zone, the pitch angle of the blades is changed in reaction to a change in rotor speed.

FIG. 5 schematically illustrates several two dimensional curves which may be obtained from the three dimensional curves of FIG. 4, each of said curves corresponding to a particular operational range as previously described. This graphic shows different cross sections of the three dimensional curve of FIG. 4, each cross section corresponding to different wind speeds. This graphic shows the axis 402 (from FIG. 4) corresponding to a scale of tower-blade distance ratios with respect to the distance in static conditions, and the axis 403 (also from FIG. 4) corresponding to a scale of pitch angles to be set on the control.

FIG. 5 shows several curves 500-504, each of them corresponding to a pitch angle 403 variation depending on the determined ratio of distance 402 between the tower and the blade in the shadow of the tower, for a (determined instantaneous representative) wind speed.

The curve 500 corresponds to the variation of the pitch angle 403 as a function of the distance ratio 402 for a wind speed of 4 m/s (first operational range). The curve 501 corresponds to the pitch angle 403 variation depending on distance ratio 402 for a wind speed of 8 m/s (second operational range). The curve 502 corresponds to the pitch angle 403 variation depending on distance ratio 402 for a wind speed of 9 m/s (third operational range). These curves 500-502 thus belong to the sub-nominal zone of operation, i.e. at wind speeds below the nominal wind speed.

The curve 503 corresponds to the variation of the pitch angle 403 depending on the distance ratio 402 for a wind speed of 15 m/s (fourth operational range). And the curve 504 corresponds to the pitch angle 403 variation depending on the distance ratio 402 for a wind speed of 21 m/s (fourth operational range). These curves 503, 504 thus belong to the supra-nominal zone of operation, i.e. at wind speeds above the nominal wind speed.

At the sub-nominal zone of operation (curves 500-502), the pitch angle 403 may start to increase from a value (or threshold) of tower distance ratio 402 which decreases as the wind speed 401 increases. In particular, FIG. 5 shows that in curve 500 (wind speed=4 m/s) the pitch angle starts to increase when the tower distance ratio 402 is about 42%, in curve 501 (wind speed=8 m/s) the pitch angle starts to increase when the tower distance ratio 402 is about 20%, and in curve 502 (wind speed=9 m/s) the pitch angle starts to increase when the tower distance ratio 402 is about 18%.

At the supra-nominal zone of operation (curves 503-504), the pitch angle 403 may start to increase from a value (or threshold) of tower distance ratio 402 which increases as the wind speed 401 increases. In particular, FIG. 5 shows that in curve 503 (wind speed of 15 m/s) the pitch angle starts to increase when the tower distance ratio 402 is about 22%, and in curve 504 (wind speed of 21 m/s) the pitch angle starts to increase when the tower distance ratio 402 is about 60%.

One purpose of the previous criteria depending on the zone of operation (sub or supra nominal zone) is to not unduly affect the normal operation of the wind turbine, at the same time that abnormal situations (possibly due to loads on the wind turbine and possibly not suitably detected by means of load sensors) may be detected and corrected (by properly pitching the blades). Note that, the tower distance ratio 402 threshold (from which the pitch angle 403 starts to increase) is smaller at wind speeds 401 close to the nominal wind speed (about 10 m/s). At these wind speeds (close to the nominal wind speed), the wind turbine is usually operating with large deflexions and at a significant level of power generation, which is desirable to be maintained while prevention of abnormal situations (e.g. caused by a wind gust) is improved.

When the wind turbine is operating under normal conditions, the smallest allowed tower distance 402 (from which the pitch angle 403 starts to increase) substantially corresponds to the nominal wind speed or close to the nominal wind speed. At sub-nominal wind speeds the thrust is low, so the allowed tower distance 402 (from which the pitch angle 403 starts to increase) may be generally higher. At supra-nominal wind speeds the blades are generally being pitched (according to a normal control strategy) for maintaining a rotor speed substantially constant (i.e. a high level of power generation), so the allowed tower distance 402 (from which the pitch angle 403 starts to increase) may also be generally higher. All these considerations can be derived from FIG. 4 and FIG. 5.

For example, at a wind speed of 5 m/s, pitching of the blades (according to embodiments of the proposed method) may be started when the tower distance is e.g. about 5 m, since an expected tower distance under normal operational conditions may be about 6 m. It should be noted that e.g. pitching may (temporarily) be used even in the sub-nominal zone of operation. And at a wind speed of 10 m/s, pitching of the blades (according to embodiments of the proposed method) may be started when the tower distance is e.g. about 1.5 m, since an expected tower distance under normal operational conditions (at a wind speed of 10 m/s) may be about 2 m. A tower distance threshold of about 5 m at a wind speed of 10 m/s would probably reduce loads on the turbine but also the generation of power, which is not desirable to occur.

The three dimensional curve of FIG. 4 and the two dimensional curves of FIG. 5 (obtained from the curve of FIG. 4) correspond to a particular embodiment of the invention. In other embodiments, other curves similar to those illustrated by FIGS. 4 and 5 could be used, said other curves responding to other "sensitivities" about detecting and correcting abnormal situations (possibly due to loads on the turbine) and keeping a still acceptable generation of power. For example, curves penalizing the generation of power under punctual conditions in order to have an increased sensitivity (of detection and correction of abnormal situations) could be used in other implementations.

The curves illustrated by FIGS. 4 and 5 or other similar curves may be obtained from theoretically calculated values. These calculations may be based on simulations taking into account a theoretical model of the wind turbine. For example, a Finite Element Method (FEM) may be used for calculating said values to generate a corresponding function defining pitch adjustments depending on the wind speed and the distance between the tower and a blade in the shadow of the tower. In addition or alternatively to these calculated theoretical values, suitable values could also be experimentally obtained by measuring necessary parameters under controlled conditions. In this latter case, self-learning algorithms could be employed to define pitch adjustments or, alternatively, to tune pitch adjustments already defined by other means, e.g. by FEM analysis.

In any of the previously described implementations of a curve relating wind speed 401, pitch angle 403 and distance to tower 402, the pitch angle component 403 may refer to a minimum pitch angle, such that at least one of the blades are pitched to this minimum pitch angle when prevailing conditions lead to abnormally low distance between the blade and the tower.

Although only a number of particular embodiments and examples of the invention have been disclosed herein, it will be understood by those skilled in the art that other alternative embodiments and/or uses of the invention and obvious modifications and equivalents thereof are possible. Furthermore, the present invention covers all possible combinations of the particular embodiments described. Thus, the scope of the present invention should not be limited by particular embodiments, but should be determined only by a fair reading of the claims that follow.

The invention claimed is:

1. A method of operating a wind turbine having a tower, a nacelle, a rotor with a plurality of blades arranged on a rotor hub on the tower, one or more pitch systems for pitching the blades to a pitch angle, a system for determining an instantaneous representative wind speed, and a system for determining a distance between a blade and the tower;
   the method comprising:
   determining the instantaneous representative wind speed from a wind sensor mounted on the nacelle;
   determining the distance between the tower and one of the blades when the blade is in front of the tower;
   determining a tower distance pitch adjustment to pitch angle of the blades depending on the determined distance between the tower and the blade in front of the tower and on the determined instantaneous representative wind speed;
   the one or more pitch systems applying the determined tower distance pitch adjustment to at least a next blade to be in front of the tower;
   wherein the blades are rotatable relative to the rotor hub and the pitch angle of the blades is adjusted by rotating the rotor blade around a rotational pitch axis of the rotor blade relative to the rotor hub;
   the step of determining the pitch adjustment comprising:
   defining, a distance threshold as a percentage of a static distance between the tower and the blade in front of the tower, the distance threshold varying depending on the instantaneous representative wind speed;
   at the determined instantaneous wind speed, when distance of the blade in front of the tower is determined to be less than the distance threshold, determining a magnitude of the pitch adjustment based on actual distance of the blade to the tower and the determined instantaneous wind speed.

2. The method according to claim 1, wherein the distance threshold increases as the instantaneous representative wind speed increases, when the instantaneous representative wind speed is above a nominal wind speed.

3. The method according to claim 1, wherein
   when the distance between the tower and the blade in front of the tower is above the distance threshold, the pitch angle is a predefined pitch angle according to a conventional control strategy.

4. The method according to claim 1, wherein the one or more pitch systems comprise a collective pitch system, and wherein the pitch adjustment is applied to all the blades of the wind turbine.

5. The method according to claim 1, wherein the wind turbine comprises an individual pitch control for each blade, and wherein the pitch adjustment is only applied to the next blade of the wind turbine to be in front of the tower.

6. The method according to claim 1, wherein the instantaneous representative wind speed is determined based on a wind speed measurement of a nacelle mounted anemometer.

7. The method according to claim 6, wherein the wind speed measurement of the nacelle mounted anemometer is an average wind speed measured over a period of time.

8. The method according to claim 7, wherein the period of time is between 1-5 seconds.

9. The method according to claim 1, wherein the system for determining the distance between a blade and the tower comprises an emitter arranged on each blade and a receiver arranged on the tower; wherein each of the emitters and the receiver are arranged in such a way that, at least when any of the blades is in front of the tower, a distance between the emitter of the blade in front of the tower and the receiver can be inferred from a signal transmission between the emitter of the blade in front of the tower and the receiver.

10. The method according to claim 9, wherein the tower's receiver is arranged at a given height with respect to the ground, and each blade's emitter is arranged in such a way that, when the blade is in front of the tower, the blade's emitter achieves a position at the substantially same height as the tower's receiver.

11. The method according to claim 9, wherein each blade's emitter is arranged in a position closer to a tip of the blade than to the rotor hub.

12. The method according to claim 1, wherein the system for determining the distance between a blade and the tower comprises a receiver arranged on each blade and an emitter arranged on the tower; wherein each of the receivers and the emitter are arranged in such a way that, at least when any of the blades is in front of the tower, a distance between the receiver of the blade in front of the tower and the emitter can be inferred from a signal transmission between the emitter and the receiver of the blade in front of the tower.

13. A wind turbine configured to perform the method according to claim 1.

* * * * *